United States Patent
Lewis

(10) Patent No.: US 8,024,739 B2
(45) Date of Patent: Sep. 20, 2011

(54) SYSTEM FOR INDICATING AND SCHEDULING ADDITIONAL EXECUTION TIME BASED ON DETERMINING WHETHER THE EXECUTION UNIT HAS YIELDED PREVIOUSLY WITHIN A PREDETERMINED PERIOD OF TIME

(75) Inventor: Russell Lee Lewis, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 1290 days.

(21) Appl. No.: 11/621,495

(22) Filed: Jan. 9, 2007

(65) Prior Publication Data
US 2008/0168447 A1 Jul. 10, 2008

(51) Int. Cl.
*G06F 9/46* (2006.01)

(52) U.S. Cl. ....................................... 718/104

(58) Field of Classification Search ................. 718/104, 718/102, 103, 107, 10
See application file for complete search history.

(56) References Cited

U.S. PATENT DOCUMENTS

| | | | | |
|---|---|---|---|---|
| 5,987,492 A * | 11/1999 | Yue | ................. | 718/102 |
| 6,148,322 A * | 11/2000 | Sand et al. | .............. | 718/103 |
| 6,260,057 B1 * | 7/2001 | Eykholt et al. | ............. | 718/102 |
| 6,272,517 B1 * | 8/2001 | Yue et al. | ................ | 718/102 |
| 6,668,269 B1 * | 12/2003 | Kamada et al. | ............. | 718/103 |
| 2004/0117793 A1 | 6/2004 | Shaylor | | |
| 2004/0139432 A1 | 7/2004 | Bender et al. | | |
| 2004/0216112 A1 | 10/2004 | Accapadi et al. | | |
| 2005/0022186 A1 * | 1/2005 | Accapadi et al. | ............. | 718/100 |
| 2005/0223302 A1 | 10/2005 | Bono | | |
| 2006/0100996 A1 | 5/2006 | McKenney et al. | | |
| 2006/0271938 A1 * | 11/2006 | Gootherts et al. | ........... | 718/107 |

* cited by examiner

*Primary Examiner* — Meng A An
*Assistant Examiner* — Louis Diep
(74) *Attorney, Agent, or Firm* — Rabindranath Dutta; Konrad Raynes & Victor LLP

(57) ABSTRACT

Provided are a method, system, and article of manufacture, wherein an execution unit requests additional execution time from a kernel to prevent the execution unit from being swapped out during an execution of a critical section. The kernel determines whether the execution unit has previously avoided yielding execution to other execution units within a predetermined period of time after being allocated the additional execution time in response to at least one previous request for the additional execution time. The kernel allocates the additional execution time to the execution unit, in response to determining that the execution unit has not previously avoided yielding execution to the other execution units within the predetermined period of time after being allocated the additional execution time in response to the at least one previous request for the additional execution time.

20 Claims, 8 Drawing Sheets

SYSTEM FOR INDICATING AND SCHEDULING ADDITIONAL EXECUTION TIME BASED ON DETERMINING WHETHER THE EXECUTION UNIT HAS YIELDED PREVIOUSLY WITHIN A PREDETERMINED PERIOD OF TIME

BACKGROUND

1. Field

The disclosure relates to a method, system, and article of manufacture for the scheduling of execution units.

2. Background

An execution unit is a generic term for one entity of a collection of concurrently executing entities, where the collection of concurrently executing entities may be processes or threads. A multi-tasking operating system is capable of managing a plurality of execution units that execute concurrently within a computational device in which the multi-tasking operating system is implemented.

An execution unit may be in any one of a number of states. An execution unit may be in a running state when the execution unit is currently making use of a processor, whereas the execution unit may be in a blocked state when the execution unit is waiting for making use of the processor. For example, an execution unit may be in a blocked state when the execution unit needs access to a critical resource, e.g., a semaphore. An execution unit may yield the processor for other execution units after being in a running state for a period of time. Furthermore, an execution unit may be swapped out, i.e., removed from the running state, by the kernel of the operating system, such that the execution unit is no longer in a running state. Additionally, an execution unit may be swapped in by the kernel of the operating system to bring the execution unit into a running state.

Processes and threads may be defined differently in different operating systems. In certain operating systems, a process is a "heavyweight" execution unit with its own address space, where a "heavyweight" execution unit consumes significant resources for execution in comparison to a "lightweight" execution unit, such as a thread that shares an address space with other threads. In certain other operating systems, a thread is a fundamental execution unit. Furthermore, in certain operating system, threads are associated with a process and share the environment of the process.

SUMMARY OF THE PREFERRED EMBODIMENTS

Provided are a method, system, and article of manufacture, wherein an execution unit requests additional execution time from a kernel to prevent the execution unit from being swapped out during an execution of a critical section. The kernel determines whether the execution unit has previously avoided yielding execution to other execution units within a predetermined period of time after being allocated the additional execution time in response to at least one previous request for the additional execution time. The kernel allocates the additional execution time to the execution unit, in response to determining that the execution unit has not previously avoided yielding execution to the other execution units within the predetermined period of time after being allocated the additional execution time in response to the at least one previous request for the additional execution time.

In further embodiments, a first indicator is maintained in the kernel, wherein the first indicator indicates whether the execution unit has previously avoided yielding execution to the other execution units within the predetermined period of time after being allocated the additional execution time in response to the at least one previous request for the additional execution time. At least one second indicator is maintained, wherein the second indicator indicates whether the additional time has been granted by the kernel to the execution unit. Also maintained is a third indicator that indicates whether the additional time has been requested by the execution unit from the kernel.

In still further embodiments, the execution unit updates the third indicator to indicate that the additional time is longer needed by the execution unit, in response to the execution unit exiting from the critical section. At least one other execution unit is swapped in by the kernel, in response to the updating by the execution unit of third indicator to indicate that the additional time is longer needed by the execution unit.

In additional embodiments, the execution unit is a first thread. The kernel determines that a second thread that is to be swapped in to replace the first thread is part of the same process as the first thread. The kernel allocates the additional execution time to the first thread in response to determining that the second thread that is to be swapped in to replace the first thread is part of the same process as the first thread whether or not the process has previously avoided yielding execution for other processes within the predetermined period of time.

In yet additional embodiments, the execution unit is one of a process or a thread, wherein the kernel is part of an operating system, and wherein the execution unit is not part of the kernel, and wherein the requesting, the determining, and the allocating are performed via system calls.

BRIEF DESCRIPTION OF THE DRAWINGS

Referring now to the drawings in which like reference numbers represent corresponding parts throughout.

DETAILED DESCRIPTION

Figure 1:
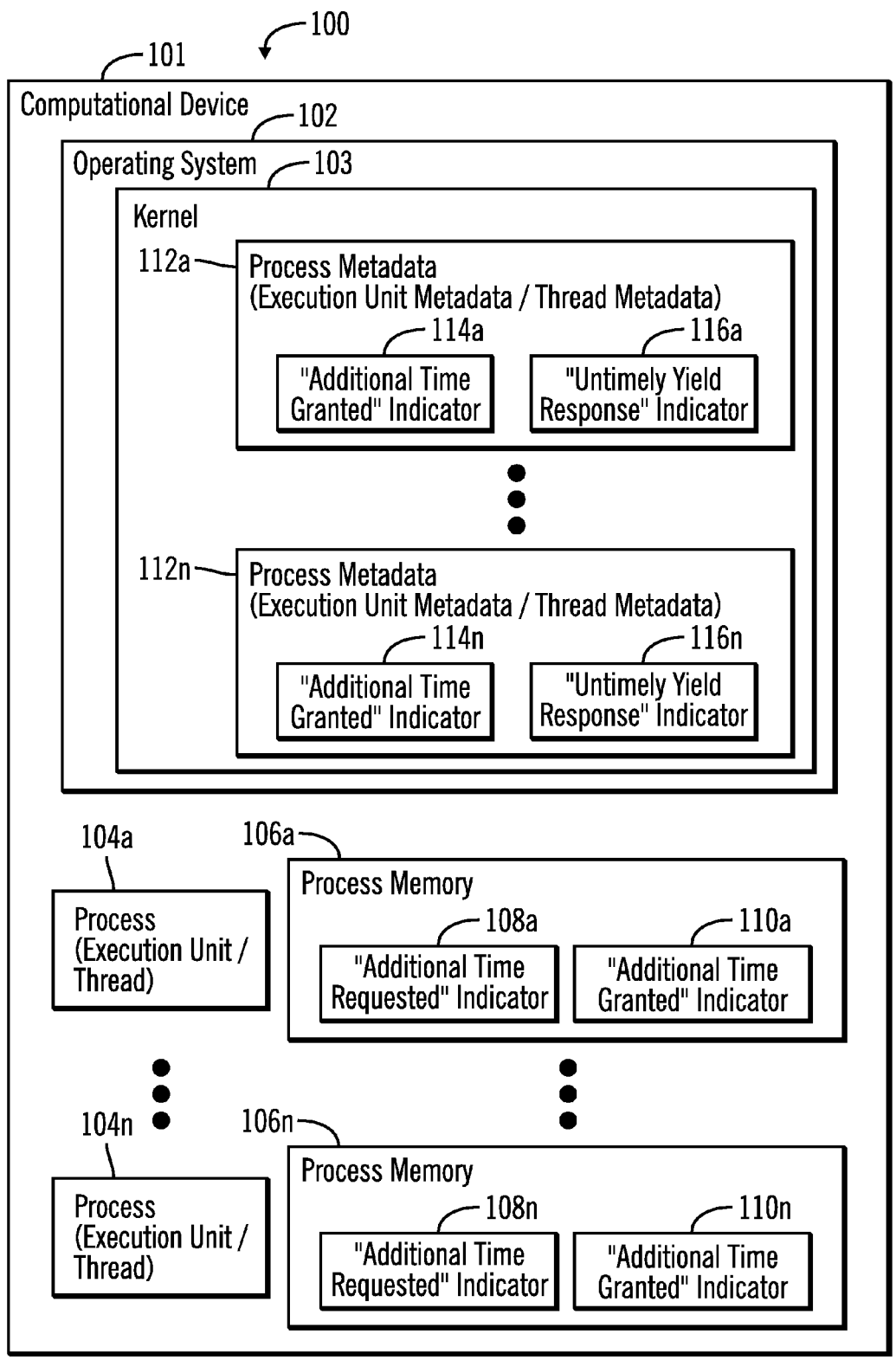
FIG. 1 illustrates a block diagram of a computing environment, in accordance with certain embodiments.

In the following description, reference is made to the accompanying drawings which form a part hereof and which illustrate several embodiments. It is understood that other embodiments may be utilized and structural and operational changes may be made.

Swapping of Execution Units in Multi-Tasking Operating Systems

In a preemptive multi-tasking operating system, a process corresponding to a user application may be aware that the multi-tasking operating system could choose to swap out the process in favor of another process at any instant of time. Sometimes a process is swapped out when the process holds a critical resource, e.g., a lock that other processes need for execution. Overall system performance may be enhanced if the process that is to be swapped out could ensure that the process releases the critical resource before the process gets swapped out.

Certain operating systems allow a process to monitor the amount of time left in the time slice of the process. This allows the process to choose to not acquire a critical resource when the time remaining for execution is not adequate for voluntarily releasing the critical resource. The process may choose to yield substantially immediately to avoid holding the critical resource when the process is swapped out, or the process may choose to perform some other operations that do not require the critical resource.

However, it is difficult for a programmer to determine exactly how long a process is likely to hold a critical resource. The programmer may need to how many operations and what type of operations the process would perform while holding the critical resource. It may not be possible for a programmer to determine exactly how long a process will hold a critical resource without allowing the process to first acquire the resource, and then estimating from the number of operations and the types of operations the amount of time the process is likely to hold the critical resource. Additionally, before attempting any critical resource, the process may have to query the operating system about how much time is left in the time slice of the process. This may need a system call into the kernel, which introduces undesirable overhead to the runtime performance of the process.

There exist certain mechanisms that are used in certain kernels to allow the kernel to disable thread preemption for a short time. This is how preemption works in the kernel of certain operating systems. For example, in certain operating systems kernel preemption is on by default, but can be turned off by kernel code around critical sections. This cannot be used, however, by processes corresponding to user applications, since user applications do not execute in the kernel.

Certain embodiments implement a kernel service that allows a process corresponding to a user application to request for a limited amount of extra time, such that the process is prevented from being swapped out during the execution of critical sections. For example, the limited amount of extra time may be requested when the process holds a lock or a semaphore. The kernel is not required to grant extra time to the process, but should the kernel grant extra time to the process, then the process is notified that the process should yield execution to other processes as soon as possible. Processes that request extra time but then fail to yield promptly may be marked as "badly behaved" by the kernel, and the kernel may avoid granting requests for extra time for such "badly behaved" processes in the future.

Certain embodiments structure the request mechanisms, such that the request mechanisms add relatively little overhead to the process and the kernel. As a result it is possible for the process corresponding to a user application to request extra time every time that the process requests a lock or any other type of critical resource. For example, certain embodiments may be implemented with indicators, such as flags in memory, so that system calls are not needed and in such cases limited runtime overhead is added for implementing these embodiments.

Exemplary Embodiments

FIG. 1 illustrates a block diagram of a computing environment 100 that includes a computational device 101, in accordance with certain embodiments. The computational device 101 may comprise any suitable computational platform, including those presently known in the art, such as, a personal computer, a workstation, a mainframe, a midrange computer, a network appliance, a palm top computer, a telephony device, a blade computer, a hand held computer, etc. The computational device 101 includes an operating system 102 that includes a kernel 103, wherein the operating system 102 may comprise any suitable operating system, including those presently known in the art.

A plurality of execution units, such as a plurality of processes 104a . . . 104n corresponding to a plurality of user applications execute within the computational device 101. Since the plurality of processes 104a . . . 104n correspond to user applications, the plurality of processes execute outside the execution space of the kernel 103. In certain embodiments, the plurality of execution units 104a . . . 104n may be threads instead of or in addition to processes.

Corresponding to each of the processes 104a . . . 104n, the computational device 101 maintains a plurality of process memories 106a . . . 106n, where process memory 106a corresponds to the process 104a and the process memory 106n corresponds to the process 104n. Each process memory 106a . . . 106n includes data and indicators related to the execution of the processes 104a . . . 104n in the computational device 101. For example, the process memories 106a . . . 106n may include "additional time requested" indicators 108a . . . 108n and "additional time granted" indicators 110a . . . 110n. The "additional time requested" indicator, such as the "additional time requested" indicator 108a, indicates whether the corresponding process, such as process 104a, desires an additional period of time to continue execution of a critical section. The "additional time granted" indicator, such as the "additional time granted" indicator 110a, indicates whether the corresponding process, such as process 104a, has been granted an additional period of time by the kernel 103 to continue the execution of a critical section.

Corresponding to each of the processes 104a . . . 104n, the kernel 103 maintains a plurality of process metadata 112a . . . 112n, where the process metadata 112a corresponds to the process 104a and the process metadata 112n corresponds to the process 104n. Each process metadata 112a . . . 112n includes one or more indicators related to the execution of the processes 104a . . . 104n, where the indicators may be used by the kernel 103. For example, the process metadata 112a . . . 112n may include "additional time granted" indicators 114a . . . 114n and "badly behaved process" indicators 116a . . . 116n. The "additional time granted" indicator in the kernel 103, such as the "additional time granted" indicator 114a, indicates whether the corresponding process, such a process 104a, has requested an additional period of time to continue execution of a critical section. The "badly behaved process" indicator, such as the "badly behaved process" indicator 116a, indicates whether the corresponding process, such a process 104a, is a badly behaved process, where a badly behaved process is a process that has previously avoided yielding execution to other processes within a predetermined period of time after being allocated the additional execution time in response to at least one previous request for the additional execution time by the process. The amount of the predetermined period of time may be different in different embodiments.

In certain exemplary embodiments, the "badly behaved process" indicator 116a may be referred a first indicator, the "additional time granted" indicators 110a, 114a may be referred to as a second indicator, and "the additional time requested" indicator 108a may be referred to as a third indicator. Therefore, FIG. 1 illustrates certain embodiments in which a first indicator 116a is maintained in the kernel 103, wherein the first indicator 116a indicates whether an execution unit 104a has previously avoided yielding execution to the other execution units within a predetermined period of time after being allocated an additional execution time in response to the at least one previous request for the additional execution time. At least one second indicator 110a, 114a that indicates whether the additional time has been granted by the kernel 103 to the execution unit 104a is maintained. A third indicator 108a that indicates whether additional time has been requested by the execution unit 104a from the kernel 103 is also maintained.

Figure 2:
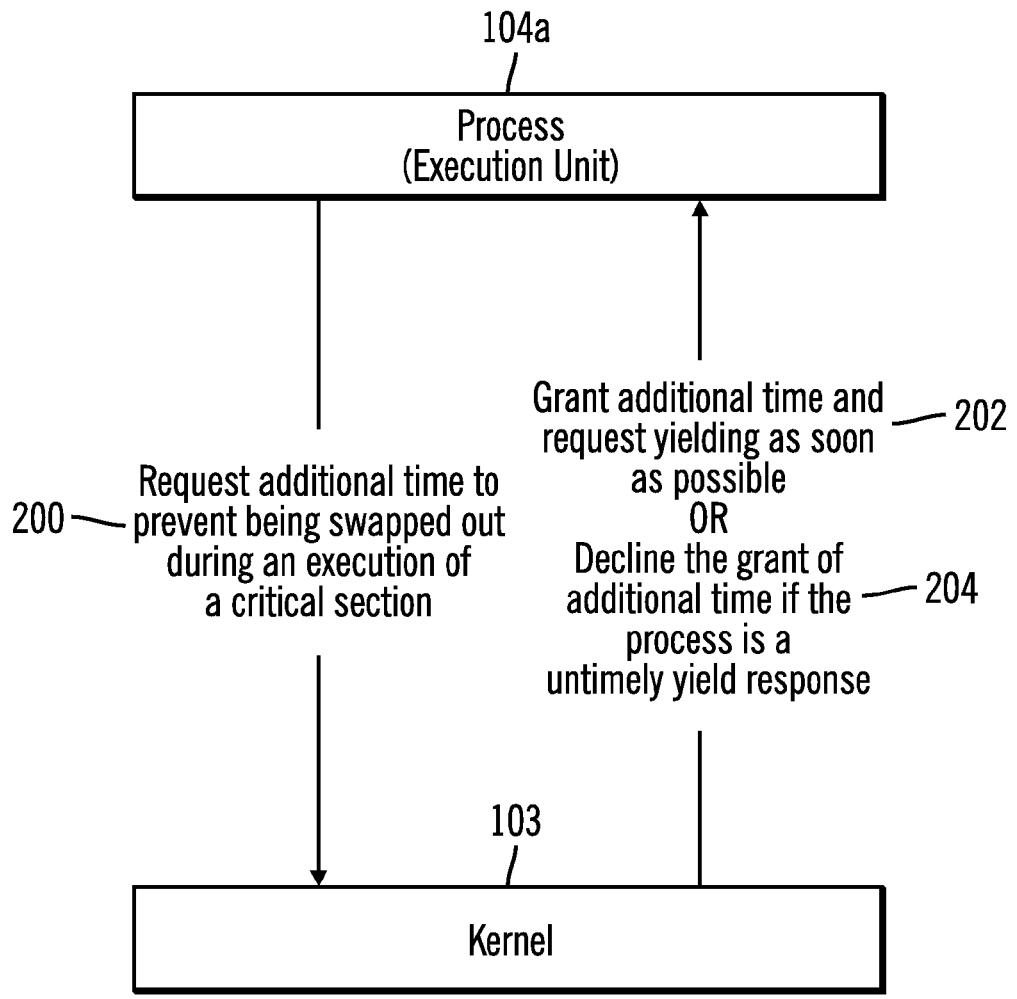
FIG. 2 illustrates a block diagram that shows interactions between a process and the kernel of an operating system, in accordance with certain embodiments.

FIG. 2 illustrates a block diagram that shows the interactions between an execution unit, such as a process 104a, and the kernel 103 of an operating system 102, in accordance with certain embodiments.

In certain embodiments, the process 104a may request (reference numeral 200) additional time to prevent being swapped out during an execution of a critical section, where a critical section is a segment of code in which the process 104a uses one or more resources that can be used by other processes, where the one or more resources must not be used by the other processes and the process 104a at the same time. In response, the kernel 103 may grant (reference numeral 202) the additional time to the process 104a and request that the process 104a should yield to other processes as soon as possible, in response to determining that the process 104a is not a badly behaved process as indicated by the "badly behaved process" indicator 116a. If the process 104a is a badly behaved process as indicated by the "badly behaved process" indicator 104a, then the kernel 103 may decline (reference numeral 204) to grant the additional time to the process 104a.

Figure 3:
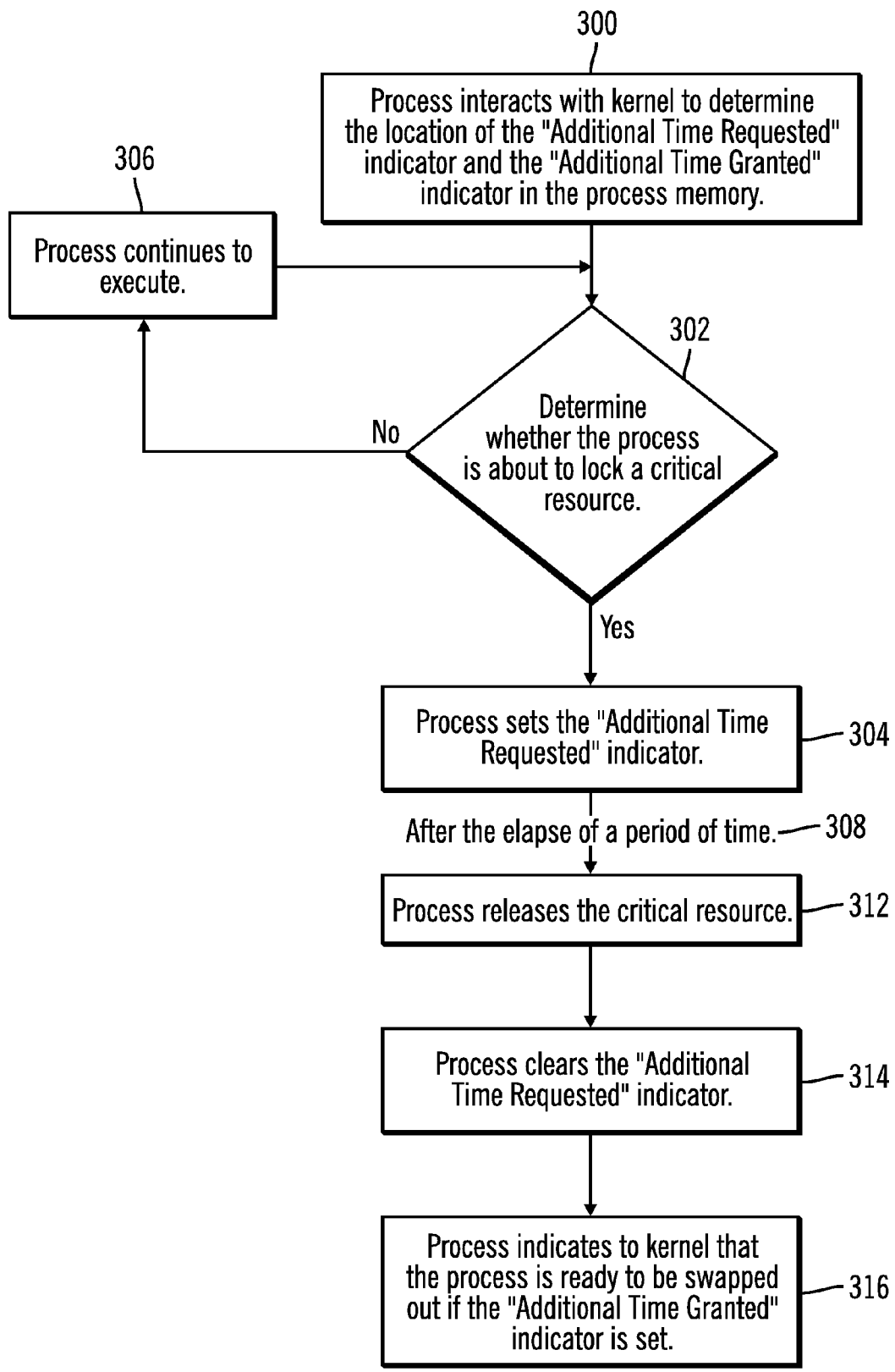
FIG. 3 illustrates operations performed by a process, in accordance with certain embodiments.

FIG. 3 illustrates operations performed by a process, such as process 104a, in accordance with certain embodiments. The operations illustrated in FIG. 3 are implemented in the computational device 101 of the computing environment 100.

Control starts at block 300, where the process 104a interacts with the kernel 103 to determine the location of the "additional time requested" indicator 108a and the "additional time granted" indicator 110a in the process memory 106a. Control proceeds to block 302 where the process 104a determines whether the process 104a is about to lock a critical resource. If so, then the process 104a sets (at block 304) the "additional time requested" indicator 108a, wherein setting the "additional time requested" indicator 108a denotes that additional time is requested by the process 104a to execute a critical section. If not, then the process 104a continues (at block 306) to execute and control may return to block 302 once again if a determination needs to be made as to whether the process 104a is about to lock a critical resource.

After the elapse of a period of time (reference numeral 308), the process 104a releases (at block 312) the critical resource and clears (at block 314) the "additional time requested" indicator 108a and the process 104a indicates (at block 316) to the kernel 103 that the process 104a is read to be swapped out if the "Additional Time Granted" indicator 110a, 114a is set. In certain embodiments, a process may acquire many locks, and only once in a relatively large period of time would the scheduler run while the process is holding one of the locks. In such embodiments, the process only notifies the kernel 103 in the case where the process is actually running under grace, i.e., where additional time has been granted to the process.

Therefore, FIG. 3 illustrates certain embodiments, in which the execution unit 104a updates an "additional time requested" indicator 108a to indicate whether additional time is requested by the execution unit 104a for executing a critical section. The execution unit 104a also updates the "additional time requested" indicator 108a to indicate that the additional time is longer needed by the execution unit 104a, in response to the execution unit 104a exiting from the critical section.

Figure 4:
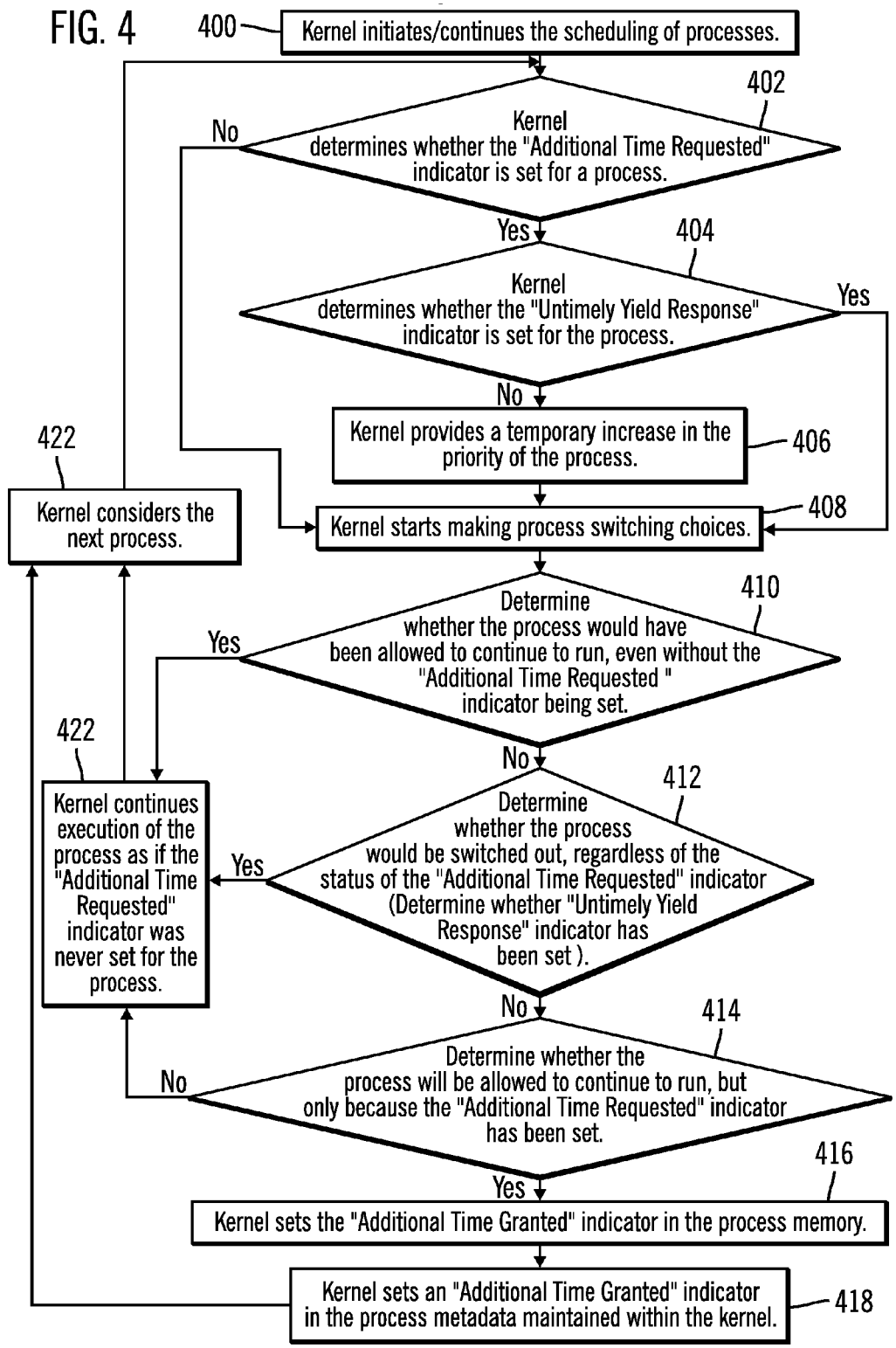
FIG. 4 illustrates first operations performed by a kernel, in accordance with certain embodiments.

FIG. 4 illustrates first operations performed by a kernel 103, in accordance with certain embodiments. The operations illustrated in FIG. 4 are implemented in the computational device 101 of the computing environment 100.

Control starts at block 400, where the kernel 103 initiates or continues the scheduling of processes 104a . . . 104n. The kernel 103 determines (at block 402) whether the "additional time requested" indicator 108a is set for the process 104a. If so, then the kernel 103 determines (at block 404) whether the "badly behaved process" indicator 116 is set for the process 104a. If the kernel 103 determines (at block 404) that the "badly behaved process" indicator 116 is not set for the process then the kernel 103 provides a temporary increase in the priority of the process 104a and starts (at block 408) making process switching choices.

The kernel 103 determines (at block 410) whether the process 104a would have been allowed to continue to run, even if the "additional time requested" indicator 108a were not set. If not, then the kernel 103 determines (at block 412) whether the process 104a would be switched out, regardless of the status of the "additional time requested" indicator 108a. The process 104a may be switched out if the "badly behaved process" indicator 116a has been set for process 104a. Therefore, certain embodiments determine whether or not a previously implemented scheduling mechanism would have allowed the process 104a to keep running. If so, then grace, i.e., grant of additional time, does not apply to the process 104a. Note, however, that just because grace was granted to a process does not mean that the process will continue to run, but rather it means that the process gets a temporary boost of priority. Other exemplary reasons why a process might be switched out include: presence of another, very high priority process which wants to run; the blocking of the process for some reason, such as page fault, etc.

If the kernel 103 determines (at block 412) that the process 104a would not be switched out, regardless of the status of the "additional time requested" indicator 108a then control proceeds to block 414. The process 104a determines (at block 414) whether the process 104a will be allowed to continue to run, but only because the "additional time requested" indicator 108a has been set. If the process 104a determines (at block 414) that the process 104a will be allowed to continue to run because the "additional time requested" indicator 108a has been set, then control proceeds to block 416. The kernel 103 sets (at block 416) the "additional time granted" indicator 110a in the process memory 110a. At block 418, the kernel 103 sets the "additional time granted" indicator 114a in the process metadata 112a maintained within the kernel 103. From block 418 control proceeds to block 422 where the kernel 103 considers the next process.

If the execution of block 410 results in an affirmative answer, or if the execution of block 412 results in an affirmative answer, or if the execution of block 414 results in a negative answer, then the kernel 103 continues (at block 420) execution of the process 104a as if the "additional time requested" indicator 108a was never set for the process 104a. From block 420 control proceeds to block 422 where the kernel 103 considers the next process and control returns to block 402 where the determination is made for the next process. Also, if the execution of block 402 results in a negative answer or if the execution of block 404 results in an affirmative answer then control proceeds to block 408 where the kernel 103 starts making process switching choices.

Therefore, FIG. 4 illustrates certain embodiments in which the kernel 103 sets an "additional time granted" indicator 114a in the process metadata 112a maintained within the kernel 103, in response to a request for additional time from the process 104a.

Figure 5:
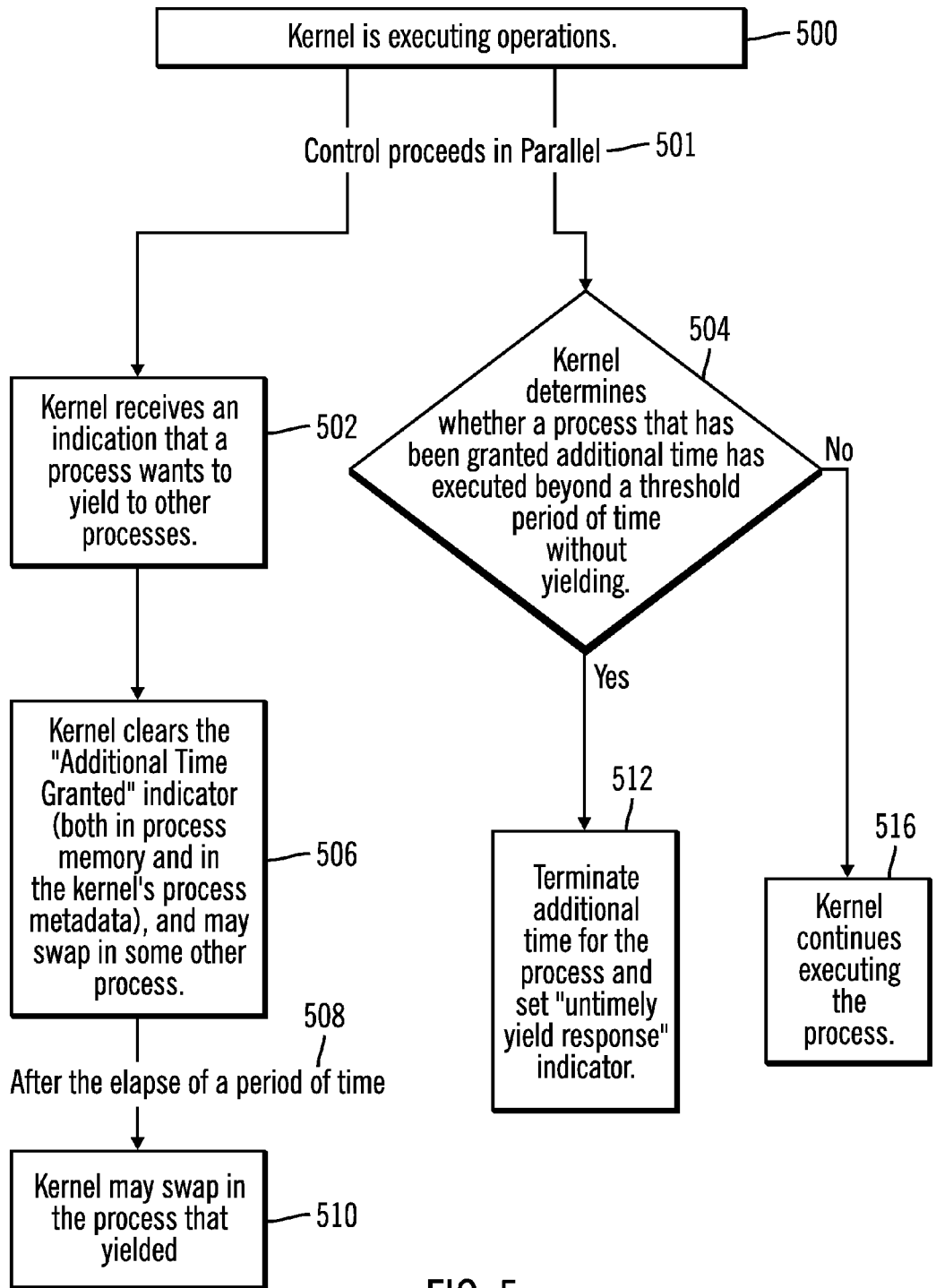
FIG. 5 illustrates second operations performed by a kernel, in accordance with certain embodiments.

FIG. 5 illustrates second operations performed by the kernel 103, in accordance with certain embodiments. The operations illustrated in FIG. 5 are implemented in the computational device 101 of the computing environment 100.

Control starts at block 500, where the kernel 103 is executing operations, and from block 500 control proceeds (reference numeral 501) in parallel to blocks 502 and 504.

At block 502, the kernel 103 receives an indication that a process 104a wants to yield to other processes. The kernel 103 clears (at block 506) the "additional time granted" indicator 108a in process memory 106a and the "additional time granted" indicator 114a in the process metadata 112a of the kernel 103, and may swap in some other process that is different from the process 104a. After the elapse (reference numeral 508) of a period of time the kernel 103 may swap in (at block 510) the process 104a that yielded to other processes.

At block 504, the kernel 103 determines whether a process 104a that has been granted additional time has executed beyond a threshold period of time without yielding to other processes. If so, then the kernel terminates (at block 512) the additional time granted for the process 104a, and sets the "badly behaved process" indicator 116a corresponding to the process 104a to indicate that the process 104a is a badly behaved process. If at block 504, the kernel 103 determines that a process 104a that has been granted additional time has not executed beyond a threshold period of time without yielding to other processes then the kernel 103 continues (at block 516) executing the process 104a.

Therefore, FIG. 5 illustrates certain embodiments in which the kernel 103 clears the "additional time granted" indicator 110a, 114a and swaps process 104a with another process. Furthermore, if a process has executed beyond a threshold period of time without yielding the process may be indicated as a badly behaved process by the kernel 103.

Figure 6:
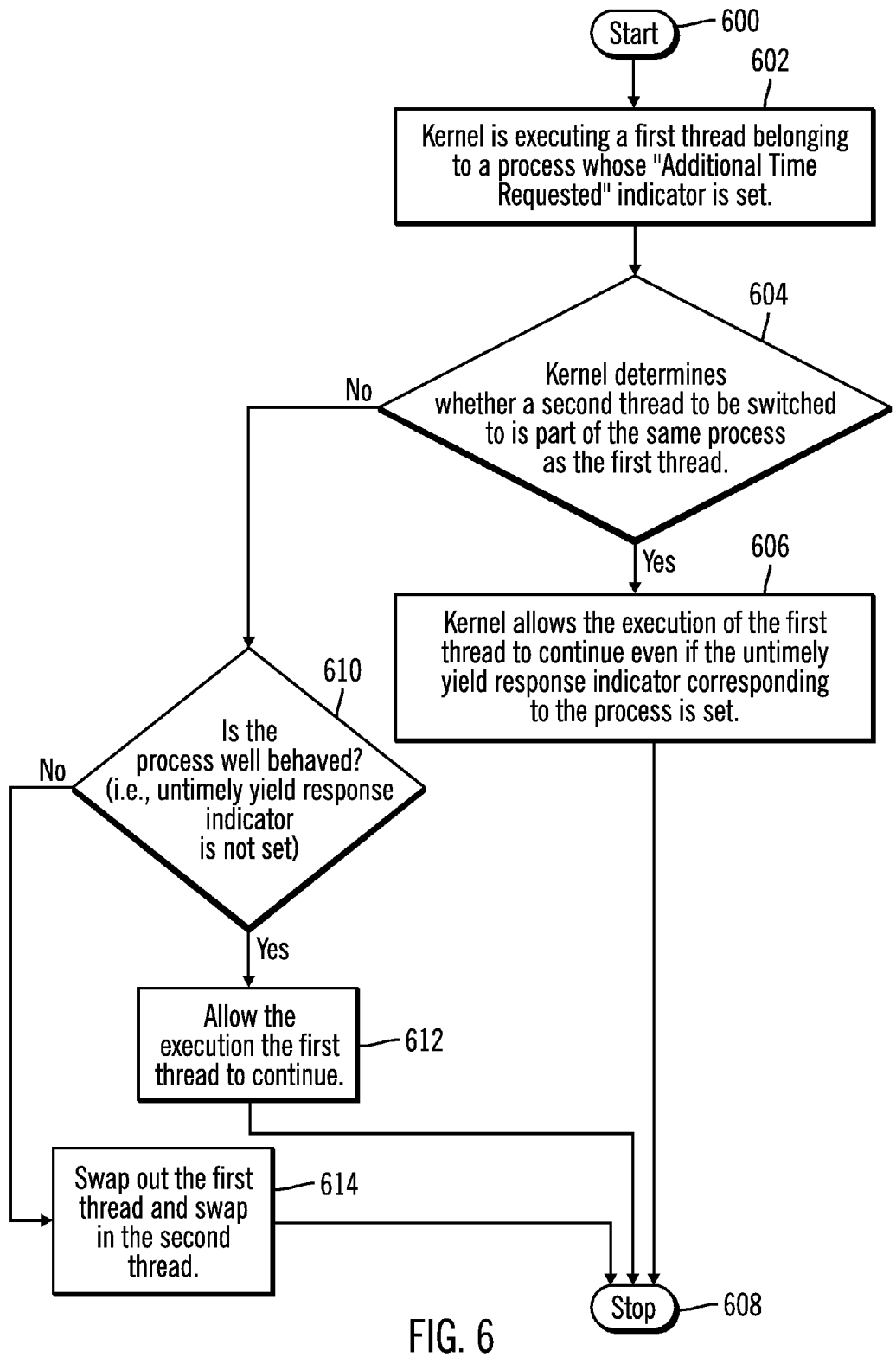
FIG. 6 illustrates third operations performed by a kernel, in accordance with certain embodiments.

FIG. 6 illustrates third operations performed by a kernel 103, in accordance with certain embodiments. The operations illustrated in FIG. 6 are implemented in the computational device 101 of the computing environment 100, wherein the units of execution 104a . . . 104n can comprise processes and threads that belong to the processes.

Control starts at block 600, and continues to block 602 wherein block 602 shows that the kernel 103 is executing a first thread belonging to a process whose "additional time requested" indicator is set in the process memory 106a . . . 106n. The kernel 103 determines (at block 604) whether a second thread to be switched to is part of the same process as the first thread. If so, then the kernel 103 allows (at block 606) the execution of the first thread to continue even if the "badly behaved process" indicator corresponding to the process is set, and the process stops (at bock 608).

If the kernel 103 determines (at block 604) that a second thread to be switched to is not part of the same process as the first thread, then a determination (at block 610) is made as to whether the process is well behaved, i.e., the "badly behaved process" indicator has not been set of the process. If the process is determined to be well behaved at block 610, then the kernel 103 allows (at block 612) the execution the first thread to continue. If the process is determined to be not well behaved at block 610, then the kernel 103 swaps out (at block 614) the first thread and swaps in the second thread. From blocks 612 and 614, control can proceed to block 608 where the process stops.

Therefore, FIG. 6 illustrates certain embodiments wherein the execution unit is a first thread, wherein a determination is make by the kernel 103 that a second thread that is to be swapped in to replace the first thread is part of the same process as the first thread. The kernel 103 allocates additional execution time to the first thread in response to determining that the second thread that is to be swapped in to replace the first thread is part of the same process as the first thread whether or not the process has previously avoided yielding execution for other processes within the predetermined period of time.

Given an assumption that all of the threads inside a certain process are part of the same program, the kernel 103 may prefer not switch out a thread that has the "additional time granted" indicator set if the thread that the kernel 103 is switching to is inside the same process. When one thread holds a critical resource, the other threads in that process are the very threads most likely to contend for that same resource. It may be acceptable to do this, because in the worst case a badly behaved thread will only break threads that are part of the same process.

Figure 7:
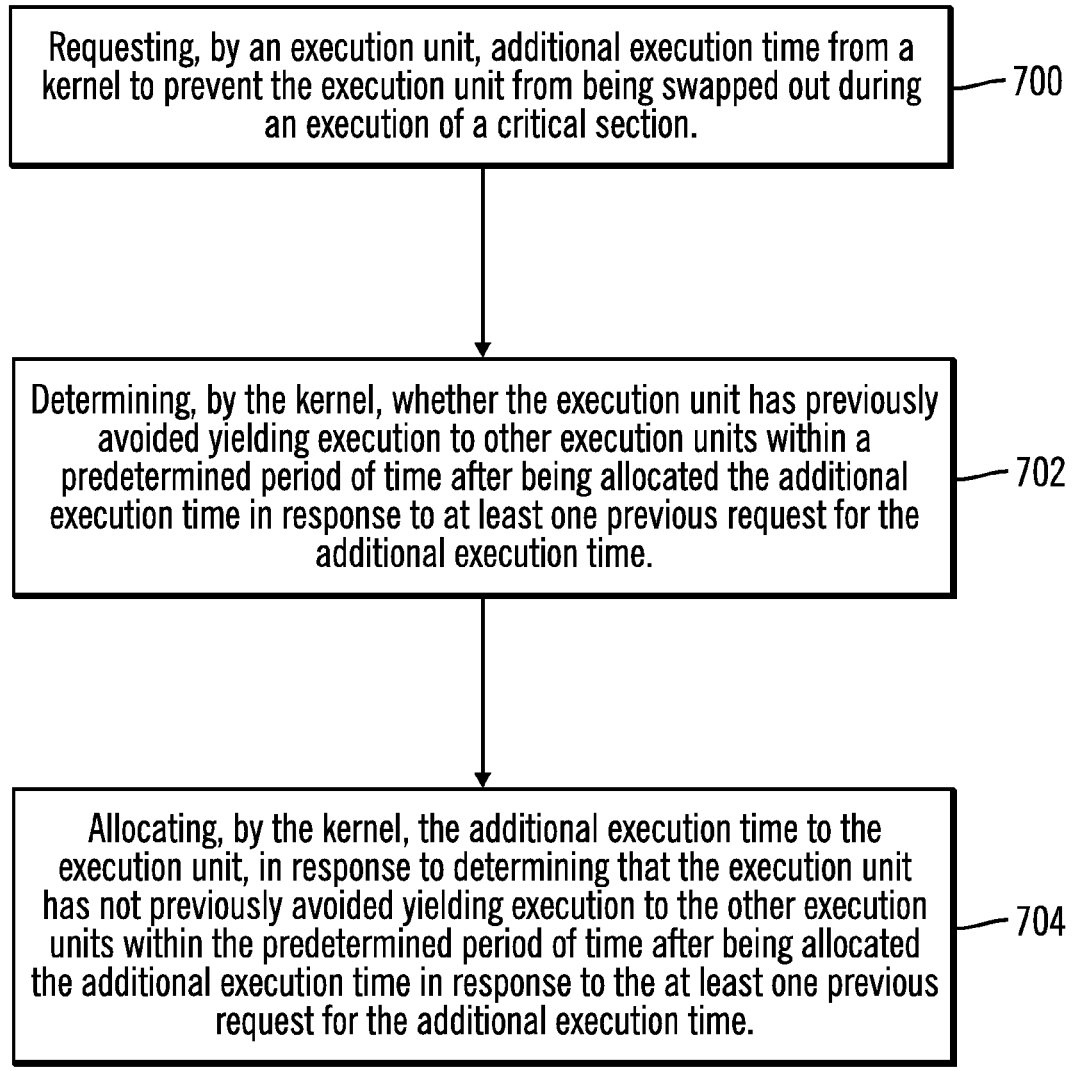
FIG. 7 illustrates operations performed by a kernel and by an execution unit, in accordance with certain embodiments.

FIG. 7 illustrates operations performed by a kernel 103 and by an execution unit, in accordance with certain embodiments. The operations illustrated in FIG. 7 are implemented in the computational device 101 of the computing environment 100.

Control starts at block 700, where an execution unit 104a requests additional execution time from a kernel 103 to prevent the execution unit 104a from being swapped out during an execution of a critical section, The kernel 103 determines (at block 702) whether the execution unit 104a has previously avoided yielding execution to other execution units within a predetermined period of time after being allocated the additional execution time in response to at least one previous request for the additional execution time. The kernel allocates (at block 704) the additional execution time to the execution unit, in response to determining that the execution unit has not previously avoided yielding execution to the other execution units within the predetermined period of time after being allocated the additional execution time in response to the at least one previous request for the additional execution time.

In certain embodiments illustrated in FIG. 7, the execution unit 104a is one of a process or a thread, wherein the kernel 103 is part of an operating system 102, wherein the execution unit 104a is not part of the kernel 103, and wherein the requesting, the determining, and the allocating are performed via system calls rather than via the writing of indicators.

Additional Embodiment Details

The described techniques may be implemented as a method, apparatus or article of manufacture involving software, firmware, micro-code, hardware and/or any combination thereof. The term "article of manufacture" as used herein refers to code or logic implemented in a medium, where such medium may comprise hardware logic [e.g., an integrated circuit chip, Programmable Gate Array (PGA), Application Specific Integrated Circuit (ASIC), etc.] or a computer readable storage medium, such as magnetic storage medium (e.g., hard disk drives, floppy disks, tape, etc.), optical storage (CD-ROMs, optical disks, etc.), volatile and non-volatile memory devices [e.g., Electrically Erasable Programmable Read Only Memory (EEPROM), Read Only Memory (ROM), Programmable Read Only Memory (PROM), Random Access Memory (RAM), Dynamic Random Access Memory (DRAM), Static Random Access Memory (SRAM), flash, firmware, programmable logic, etc.]. Code in the computer readable storage medium is accessed and executed by a processor. The medium in which the code or logic is encoded may also comprise transmission signals propagating through space or a transmission media, such as an optical fiber, copper wire, etc. The transmission signal in which the code or logic is encoded may further comprise a wireless signal, satellite transmission, radio waves, infrared signals, Bluetooth, etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may comprise a combination of hardware and software components in which the code is embodied, processed, and executed. Of course, those skilled in the art will recognize that many modifications may be made without departing from the scope of embodiments, and that the article of manufacture may comprise any information bearing medium. For example, the article of manufacture comprises a storage medium having stored therein instructions that when executed by a machine results in operations being performed.

Certain embodiments can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, certain embodiments can take the form of a computer program product accessible from a computer usable or computer readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps, algorithms or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently.

When a single device or article is described herein, it will be apparent that more than one device/article (whether or not they cooperate) may be used in place of a single device/article. Similarly, where more than one device or article is described herein (whether or not they cooperate), it will be apparent that a single device/article may be used in place of the more than one device or article. The functionality and/or the features of a device may be alternatively embodied by one or more other devices which are not explicitly described as having such functionality/features. Thus, other embodiments need not include the device itself.

Figure 8:
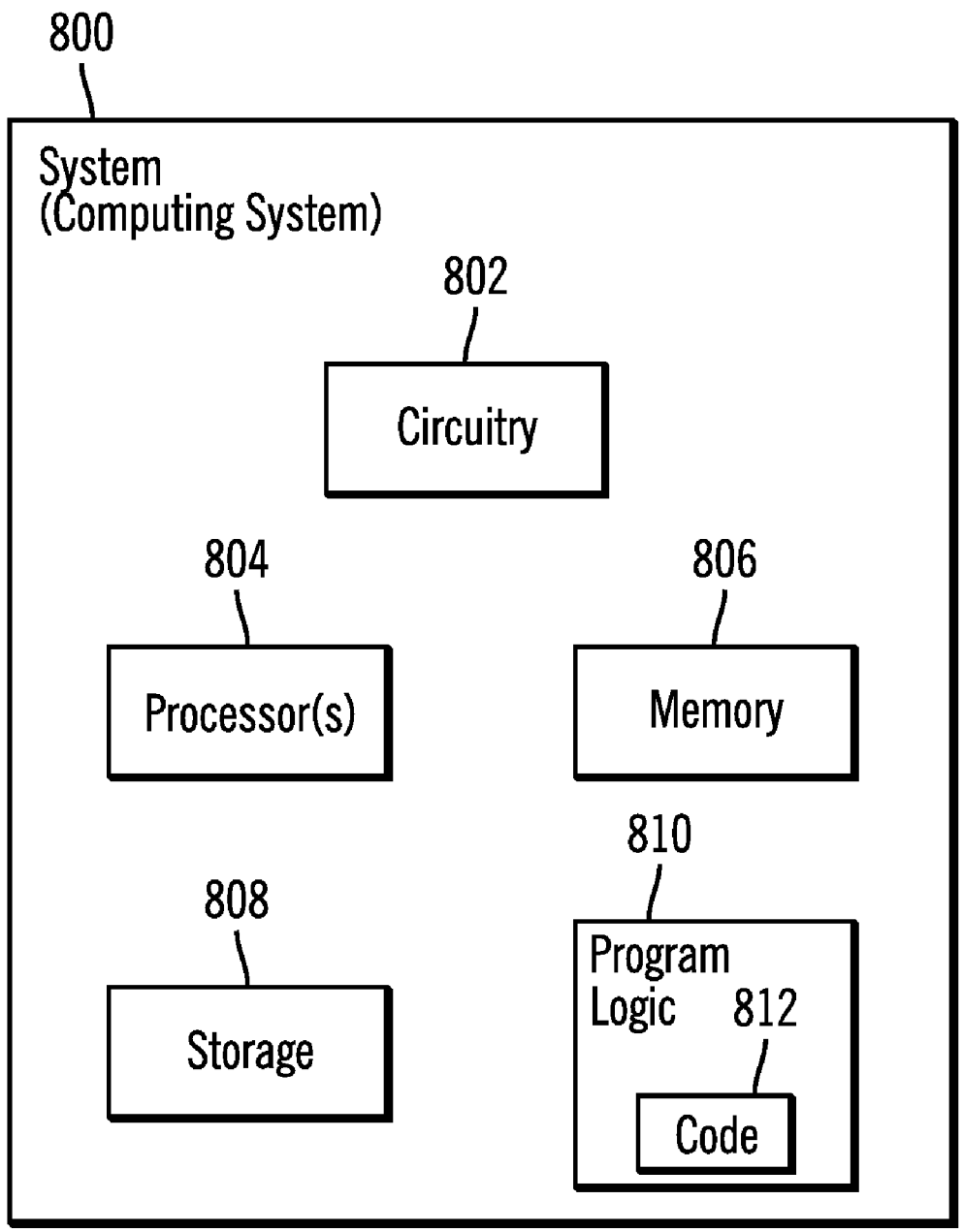
FIG. 8 illustrates a block diagram of a computer architecture in which certain described embodiments are implemented.

FIG. 8 illustrates the architecture of computing system 800, wherein in certain embodiments the computational device 101 of the computing environment 100 of FIG. 1 may be implemented in accordance with the architecture of the computing system 800. The computing system 800 may also be referred to as a system, and may include a circuitry 802 that may in certain embodiments include a processor 804. The system 800 may also include a memory 806 (e.g., a volatile memory device), and storage 808. The storage 808 may include a non-volatile memory device (e.g., EEPROM, ROM, PROM, RAM, DRAM, SRAM, flash, firmware, programmable logic, etc.), magnetic disk drive, optical disk drive, tape drive, etc. The storage 808 may comprise an internal storage device, an attached storage device and/or a network accessible storage device. The system 800 may include a program logic 810 including code 812 that may be loaded into the memory 806 and executed by the processor 804 or circuitry 802. In certain embodiments, the program logic 810 including code 812 may be stored in the storage 808. In certain other embodiments, the program logic 810 may be implemented in the circuitry 802. Therefore, while FIG. 8 shows the program logic 810 separately from the other elements, the program logic 810 may be implemented in the memory 806 and/or the circuitry 802.

Certain embodiments may be directed to a method for deploying computing instruction by a person or automated processing integrating computer-readable code into a computing system, wherein the code in combination with the computing system is enabled to perform the operations of the described embodiments.

At least certain of the operations illustrated in FIGS. 1-8 may be performed in parallel as well as sequentially. In alternative embodiments, certain of the operations may be performed in a different order, modified or removed.

Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures and components shown or referred to in FIGS. 1-8 are described as having specific types of information. In alternative embodiments, the data structures and components may be structured differently and have fewer, more or different fields or different functions than those shown or referred to in the figures. Therefore, the foregoing description of the embodiments has been presented for the purposes of illustration and description. It is not intended to be exhaustive or to limit the embodiments to the precise form disclosed. Many modifications and variations are possible in light of the above teaching.

What is claimed is:

1. A method, comprising:
    requesting, by an execution unit, a first additional execution time from a kernel to prevent the execution unit from being swapped out during an execution of a critical section, wherein the first additional execution time comprises a limited amount of extra time indicated by the execution unit;
    determining, by the kernel, whether the execution unit has previously avoided yielding execution to other execution units within a predetermined period of time after being allocated a second additional execution time in response to at least one previous request for the second additional execution time, wherein the second additional execution time is allocated prior to the requesting of the first additional execution time;
    allocating, by the kernel, the first additional execution time to the execution unit after providing a temporary increase in a priority of the execution unit, in response to determining that the execution unit has not previously avoided yielding execution to the other execution units within the predetermined period of time after being allocated the second additional execution time in response to the at least one previous request for the second additional execution time;
    maintaining a first indicator in the kernel, wherein the first indicator indicates whether the execution unit has previously avoided yielding execution to the other execution units within the predetermined period of time after being allocated the second additional execution time in response to the at least one previous request for the second additional execution time; and
    maintaining at least one second indicator that indicates whether the first additional time has been granted by the kernel to the execution unit.

2. The method of claim 1, further comprising:
    maintaining a third indicator that indicates whether the first additional time has been requested by the execution unit from the kernel.

3. The method of claim 1, wherein the requesting, by the execution unit, of the first additional execution time from the kernel to prevent the execution unit from being swapped out during an execution of a critical section does not include any indication from the execution unit to increase the any priority for the execution unit.

4. The method of claim 2, wherein the execution unit is a first thread, the method further comprising:
    determining, by the kernel, that a second thread that is to be swapped in to replace the first thread is part of the same process as the first thread; and
    allocating, by the kernel, the first additional execution time to the first thread in response to determining that the second thread that is to be swapped in to replace the first thread is part of the same process as the first thread whether or not the process has previously avoided yielding execution for other processes within the predetermined period of time.

5. The method of claim 4, wherein the execution unit is one of a process or a thread, wherein the kernel is part of an operating system, and wherein the execution unit is not part of the kernel, and wherein the requesting, the determining, and the allocating are performed via system calls.

6. A system, comprising:
    memory; and
    processor coupled to the memory, wherein the processor executes operations, the operations comprising:
    requesting, by an execution unit, a first additional execution time from a kernel to prevent the execution unit from being swapped out during an execution of a critical section, wherein the first additional execution time comprises a limited amount of extra time indicated by the execution unit;
    determining, by the kernel, whether the execution unit has previously avoided yielding execution to other execution units within a predetermined period of time after being allocated a second additional execution time in response to at least one previous request for the second additional execution time, wherein the second additional execution time is allocated prior to the requesting of the first additional execution time;
    allocating, by the kernel, the first additional execution time to the execution unit after providing a temporary increase in a priority of the execution unit, in response to determining that the execution unit has not previously avoided yielding execution to the other execution units within the predetermined period of time after being allocated the second additional execution time in response to the at least one previous request for the second additional execution time;
    maintaining a first indicator in the kernel, wherein the first indicator indicates whether the execution unit has previously avoided yielding execution to the other execution units within the predetermined period of time after being allocated the second additional execution time in response to the at least one previous request for the second additional execution time; and
    maintaining at least one second indicator that indicates whether the first additional time has been granted by the kernel to the execution unit.

7. The system of claim 6, the operations further comprising:
    maintaining a third indicator that indicates whether the first additional time has been requested by the execution unit from the kernel.

8. The system of claim 6, wherein the requesting, by the execution unit, of the first additional execution time from the kernel to prevent the execution unit from being swapped out during an execution of a critical section does not include any indication from the execution unit to increase the any priority for the execution unit.

9. The system of claim 7, wherein the execution unit is a first thread, the operations further comprising:
    determining, by the kernel, that a second thread that is to be swapped in to replace the first thread is part of the same process as the first thread; and
    allocating, by the kernel, the first additional execution time to the first thread in response to determining that the second thread that is to be swapped in to replace the first thread is part of the same process as the first thread whether or not the process has previously avoiding yielding execution for other processes within the predetermined period of time.

10. The system of claim 9, wherein the execution unit is one of a process or a thread, wherein the kernel is part of an operating system, and wherein the execution unit is not part of the kernel, and wherein the requesting, the determining, and the allocating are performed via system calls.

11. A computer readable storage, wherein code stored in the computer readable storage when executed by a computer causes operations, the operations comprising:

requesting, by an execution unit, a first additional execution time from a kernel to prevent the execution unit from being swapped out during an execution of a critical section, wherein the first additional execution time comprises a limited amount of extra time indicated by the execution unit;

determining, by the kernel, whether the execution unit has previously avoided yielding execution to other execution units within a predetermined period of time after being allocated a second additional execution time in response to at least one previous request for the second additional execution time, wherein the second additional execution time is allocated prior to the requesting of the first additional execution time;

allocating, by the kernel, the first additional execution time to the execution unit after providing a temporary increase in a priority of the execution unit, in response to determining that the execution unit has not previously avoided yielding execution to the other execution units within the predetermined period of time after being allocated the second additional execution time in response to the at least one previous request for the second additional execution time;

maintaining a first indicator in the kernel, wherein the first indicator indicates whether the execution unit has previously avoided yielding execution to the other execution units within the predetermined period of time after being allocated the second additional execution time in response to the at least one previous request for the second additional execution time; and maintaining at least one second indicator that indicates whether the first additional time has been granted by the kernel to the execution unit.

12. The computer readable storage of claim 11, the operations further comprising:

maintaining a third indicator that indicates whether the first additional time has been requested by the execution unit from the kernel.

13. The computer readable storage of claim 11, wherein the requesting, by the execution unit, of the first additional execution time from the kernel to prevent the execution unit from being swapped out during an execution of a critical section does not include any indication from the execution unit to increase the any priority for the execution unit.

14. The computer readable storage of claim 12, wherein the execution unit is a first thread, the operations further comprising:

determining, by the kernel, that a second thread that is to be swapped in to replace the first thread is part of the same process as the first thread; and allocating, by the kernel, the first additional execution time to the first thread in response to determining that the second thread that is to be swapped in to replace the first thread is part of the same process as the first thread whether or not the process has previously avoiding yielding execution for other processes within the predetermined period of time.

15. The computer readable storage of claim 14, wherein the execution unit is one of a process or a thread, wherein the kernel is part of an operating system, and wherein the execution unit is not part of the kernel, and wherein the requesting, the determining, and the allocating are performed via system calls.

16. A method for deploying computing infrastructure, comprising integrating computer-readable code into a computer, wherein the code in combination with the computer performs:

requesting, by an execution unit, a first additional execution time from a kernel to prevent the execution unit from being swapped out during an execution of a critical section, wherein the first additional execution time comprises a limited amount of extra time indicated by the execution unit;

determining, by the kernel, whether the execution unit has previously avoided yielding execution to other execution units within a predetermined period of time after being allocated a second additional execution time in response to at least one previous request for the second additional execution time, wherein the second additional execution time is allocated prior to the requesting of the first additional execution time;

allocating, by the kernel, the first additional execution time to the execution unit after providing a temporary increase in a priority of the execution unit, in response to determining that the execution unit has not previously avoided yielding execution to the other execution units within the predetermined period of time after being allocated the second additional execution time in response to the at least one previous request for the second additional execution time;

maintaining a first indicator in the kernel, wherein the first indicator indicates whether the execution unit has previously avoided yielding execution to the other execution units within the predetermined period of time after being allocated the second additional execution time in response to the at least one previous request for the second additional execution time; and maintaining at least one second indicator that indicates whether the first additional time has been granted by the kernel to the execution unit.

17. The method for deploying computing infrastructure of claim 16, wherein the code in combination with the computer further performs:

maintaining a third indicator that indicates whether the first additional time has been requested by the execution unit from the kernel.

18. The method for deploying computing infrastructure of claim 16, wherein the requesting, by the execution unit, of the first additional execution time from the kernel to prevent the execution unit from being swapped out during an execution of a critical section does not include any indication from the execution unit to increase the any priority for the execution unit.

19. The method for deploying computing infrastructure of claim 17, wherein the execution unit is a first thread, wherein the code in combination with the computer further performs:

determining, by the kernel, that a second thread that is to be swapped in to replace the first thread is part of the same process as the first thread; and allocating, by the kernel, the first additional execution time to the first thread in response to determining that the second thread that is to be swapped in to replace the first thread is part of the same process as the first thread whether or not the process has previously avoided yielding execution for other processes within the predetermined period of time.

20. The method for deploying computing infrastructure of claim 19, wherein the execution unit is one of a process or a thread, wherein the kernel is part of an operating system, and wherein the execution unit is not part of the kernel, and wherein the requesting, the determining, and the allocating are performed via system calls.

* * * * *